W. H. WAGGAMAN AND T. B. TURLEY.
APPARATUS FOR THE MANUFACTURE OF PHOSPHORIC ACID AND COMPOUNDS OF THE SAME.
APPLICATION FILED JULY 15, 1920.

1,387,817.

Patented Aug. 16, 1921.
3 SHEETS—SHEET 1.

UNITED STATES PATENT OFFICE.

WILLIAM H. WAGGAMAN AND THOMAS B. TURLEY, OF WASHINGTON, DISTRICT OF COLUMBIA.

APPARATUS FOR THE MANUFACTURE OF PHOSPHORIC ACID AND COMPOUNDS OF THE SAME.

1,387,817.  Specification of Letters Patent.  Patented Aug. 16, 1921.

Application filed July 15, 1920. Serial No. 396,611.

(FILED UNDER THE ACT OF MARCH 3, 1883, 22 STAT. L., 625.)

*To all whom it may concern:*

Be it known that we, WILLIAM H. WAGGAMAN and THOMAS B. TURLEY, citizens of the United States, and employees of the Department of Agriculture of the United States of America, residing in the District of Columbia, whose post-office address is Washington, District of Columbia, have invented a new and useful Apparatus for the Manufacture of Phosphoric Acid and Compounds of the Same.

This application is made under the act of March 3, 1883, Chapter 143 (22 Stat., 625), and the invention herein described and claimed may be used by the Government of the United States or any of its officers or employees in the prosecution of work for the Government, and any person in the United States, without payment to us of any royalty thereon.

Our invention relates to a new apparatus for making phosphoric acid and compounds of the same, and has for its object the production of such products and compounds more expeditiously and less expensively than heretofore.

The invention consists in the novel combinations of parts as will be more fully hereinafter disclosed and particularly pointed out in the claims.

In order that the precise invention may be more clearly understood and distinguished from prior art, it is said: It is a well known fact that phosphoric acid may be volatilized from its compounds by submitting an intimate mixture of coke, sand and the phosphate material to the action of high heat. It is generally believed, however, that the complete or nearly complete evolution of the phosphoric acid can not be effected except at the high temperatures attainable only in the electric furnace. Since the electrical heating of low grade materials and the recovery thereby of relatively low priced products may, in some instances be commercially impracticable, it is highly desirable that such material be handled in a furnace where the cost of making the desired product is much cheaper than in an electric furnace. Although it has been stated that phosphoric acid can only be partially freed from its compounds in a fuel heated shaft furnace of the ordinary blast furnace type, the inventors have found that 90 per cent. or more of phosphoric acid can be volatilized from mixtures of phosphate rock, silica, and coke at temperatures considerably below those attained in a blast furnace and concluded therefore that it was only necessary to employ a modified type of furnace and adjust the working conditions in order to obtain a high yield of phosphoric acid by means of fuel and a hot blast.

The furnace described in detail below is designed for burning oil tar or powdered coal with the object of expelling phosphorus and phosphoric acid from an intimate reacting mixture of phosphate rock, silica and coke or other reducing material.

In form the furnace is a combination of the blast furnace and the open hearth type and is so constructed as to preheat the green charge fed into the top of the furnace shaft before it reaches the lower and hottest part of the said shaft, and also to maintain a relatively large bath of slag in a molten state on the hearth of the slag chamber below the shaft. The escape of phosphorus and phosphoric acid is facilitated from this molten slag by playing over its surface a flame and hot air blast.

The phosphorus and phosphoric acid together with the gases of combustion are drawn or forced through the column of green charge in the furnace shaft and then proceeds through a system similar to that employed in the usual blast furnace plant, the phosphoric acid being finally absorbed or collected in some suitable manner. The slag exhausted of its phosphate content is withdrawn from time to time through suitable tap holes in the side of the hearth.

I have disclosed one type or embodiment of the invention in the accompanying drawing wherein—

Figure 1:
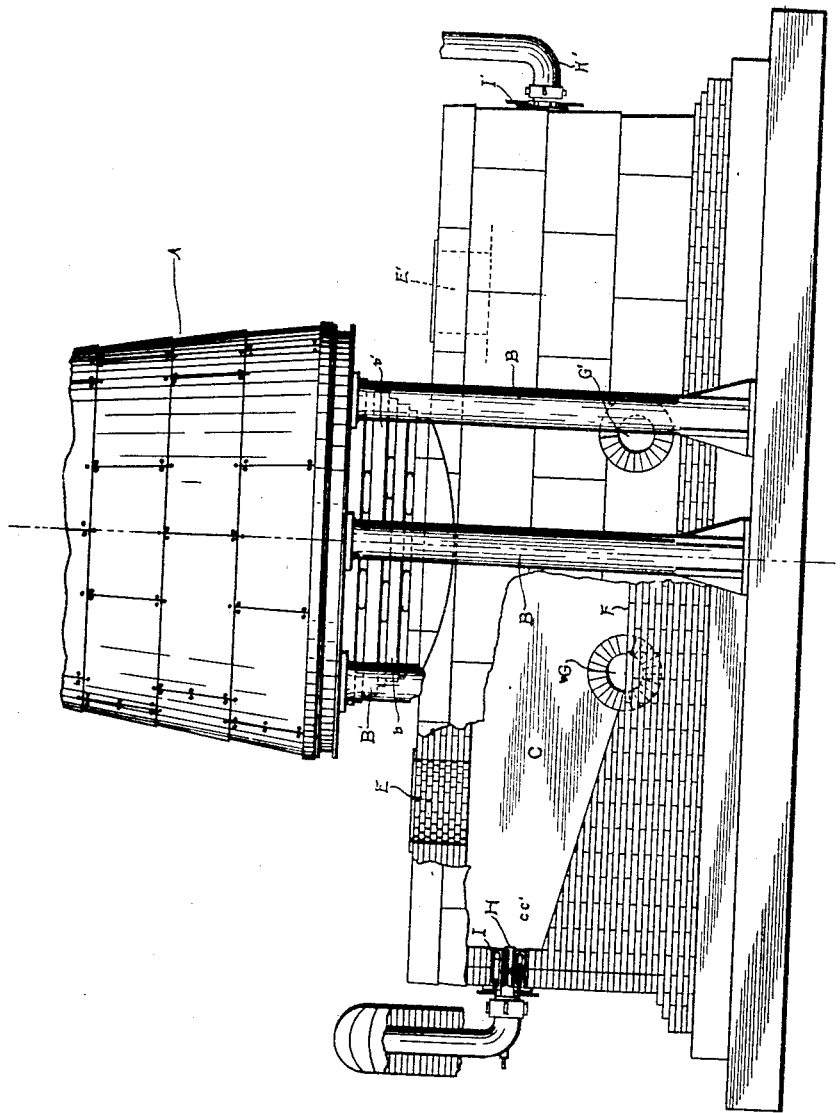
Figure 1 is a side elevation of the furnace, partly in section.
Figure 2:
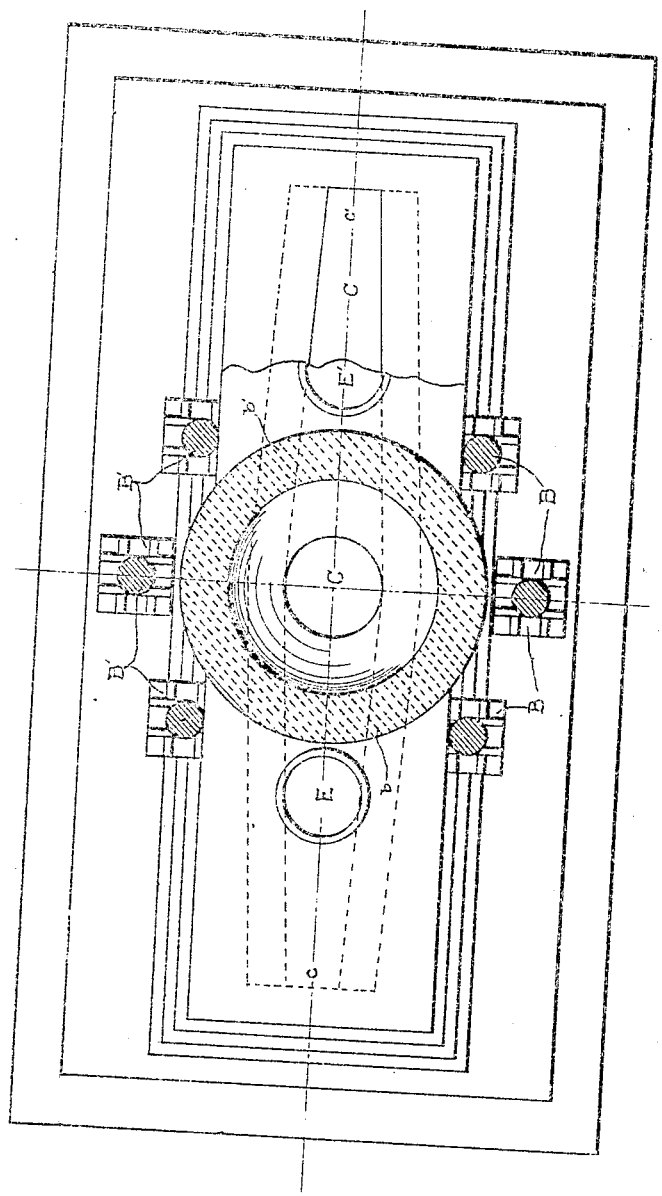
Fig. 2 is a plan view.
Figure 3:
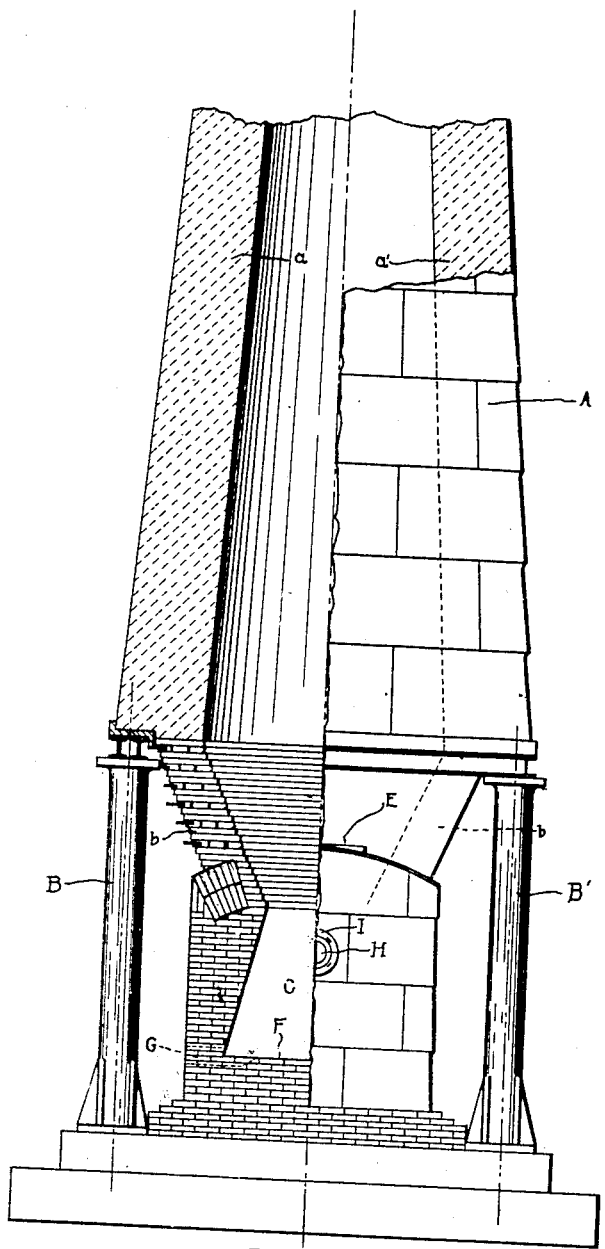
Fig. 3 is a front elevation of the furnace, partly in section.

Referring to the accompanying drawing A is the furnace shaft which is of the usual blast furnace type. The furnace walls a, a' above the boshes are supported independently by columns B, B' or other suitable devices so as to relieve the lower and hottest part of the furnace from the weight of the upper part. The bosh walls b, b' are supported in part by the walls of the slag chamber C and in part by arches which form the roof of this slag chamber. The fire brick walls of the boshes are cooled by inserting in them hollow metal plates or other devices through which water is constantly kept flowing. The lower end of the furnace shaft opens directly into the slag chamber C, which instead of being of the usual cylindrical or crucible type as in the ordinary blast furnace, with its diameter equal to that of the lowest part of the boshes, is a long chamber somewhat wider in the center but narrower at the ends c, c' than the discharge end of the furnace shaft. The width of the base or hearth of this chamber is greater than the width of its top. E, E' are openings through which additional coke may be introduced in order to facilitate the reactions on the hearth F. G, G' are tap holes through which the slag exhausted of its phosphate content is withdrawn from time to time. H, H' are oil, tar or powdered coal burners which spray or blow the fuel into the furnace, said fuel being burned by means of hot air blasts or oxygen introduced either with the fuel or through a separate orifice in any well known manner. I, I' are water jackets into which the burners are screwed or clamped in order to keep their nozzles from burning or melting at the temperatures obtained in the furnace.

From the foregoing it is thought that the construction, operation and advantages of the herein described invention will be apparent to those skilled in the art without further description, and it will be understood that various changes in the size, shape, proportion and minor details of construction may be resorted to without departing from the spirit or sacrificing any of the advantages of the invention.

Having thus described our invention we claim:

1. A combination blast and open hearth furnace for producing phosphorus and phosphoric acid provided with a shaft or charge chamber in which the reacting charge is heated to a smelting temperature, by means of fuel introduced, discharging into a slag chamber which slopes from each end toward the center and the length of which is greater than its width and the width at its base greater than the width at its top, a hearth in said slag chamber sloping from each end toward the center on which the material discharging from the shaft is maintained in a molten condition by means of flames and hot blasts introduced into said slag chamber and playing above the slag, means for withdrawing the gaseous products of the reactions from the shaft and hearth, and means for removing the slag exhausted of its phosphoric acid content, substantially as described.

2. A combination blast and open hearth furnace provided with a shaft or charge chamber in which the reacting charge is heated to a smelting temperature discharging into a slag chamber the length of which is greater than its width and the width at its base greater than the width at its top, means for introducing into said chamber flames and hot blasts to preheat the charge in the shaft and bring it to a smelting temperature and to play upon and over the slag on the hearth in order to keep said slag in a molten condition and facilitate the evolution of phosphorus and phosphoric acid, means for withdrawing the gaseous products of the reactions from the shaft and hearth, and means for removing the slag exhausted of its phosphoric acid content substantially as described.

3. A combination blast and open hearth furnace provided with a shaft or charge chamber discharging into a slag chamber the length of which is greater than its width and the width of its base greater than the width of its top, means for introducing fuel and hot blasts into said slag chamber in order to preheat the charge in the furnace shaft and bring it to a smelting temperature and to maintain flames and hot blast playing upon and over the slag and thus facilitating the reactions on the hearth, means for withdrawing the gaseous products of the reactions from the hearth and shaft, means for removing the slag exhausted of its phosphate content, and means for water cooling the burners introducing said fuel and blasts.

4. A combination blast and open hearth furnace provided with a shaft or charge chamber discharging into a slag chamber the length of which is greater than its width, means for introducing fuel and hot blasts into said slag chamber in order to preheat the charge in the furnace shaft and bring it to a smelting temperature and to maintain flames and hot blasts playing over the slag chamber, means for water cooling the burners introducing said fuel and blasts, means for introducing additional coke or a reducing agent into said slag chamber to facilitate the reactions on the hearth, means for withdrawing the gaseous products of the reactions from the shaft and hearth, and means for removing the slag exhausted of its phosphoric acid content substantially as described.

In testimony thereof, we affix our signatures in the presence of two subscribing witnesses.

WILLIAM H. WAGGAMAN.
THOMAS B. TURLEY.

Witnesses:
A. J. DECKER,
L. S. HULBERT.